US010826821B2

(12) United States Patent
Song (10) Patent No.: US 10,826,821 B2
(45) Date of Patent: Nov. 3, 2020

(54) FLOW PATH DETECTION (71) Applicant: NEW H3C TECHNOLOGIES CO., LTD.

(72) Inventor: Xiaoheng Song, Beijing (CN)

(73) Assignee: NEW H3C TECHNOLOGIES CO., LTD, Hangzhou (CN)

( * ) Notice: Subject to any disclaimer, the term of this patent is extended or adjusted under 35 U.S.C. 154(b) by 38 days.

(21) Appl. No.: 16/172,924

(22) Filed: Oct. 29, 2018

(65) Prior Publication Data

US 2019/0068492 A1 Feb. 28, 2019

Related U.S. Application Data

(63) Continuation of application No. PCT/CN2017/089489, filed on Jun. 22, 2017.

(30) Foreign Application Priority Data

Jun. 29, 2016 (CN) .......................... 2016 1 0525177

(51) Int. Cl.
*H04L 12/721* (2013.01)
*H04L 12/733* (2013.01)
(Continued)

(52) U.S. Cl.
CPC .......... *H04L 45/38* (2013.01); *G06F 9/45558* (2013.01); *H04L 41/12* (2013.01);
(Continued)

(58) Field of Classification Search
CPC ..... H04L 45/38; H04L 61/2007; H04L 41/12; H04L 61/6022; H04L 45/64; H04L 45/20; G06F 9/45558; G06F 2009/45595
See application file for complete search history.

(56) References Cited

U.S. PATENT DOCUMENTS 9,935,831 B1 * 4/2018 Wundsam ............... H04L 47/13
9,973,400 B2 * 5/2018 Su ........................... H04L 43/04
(Continued)

FOREIGN PATENT DOCUMENTS

CN 103401726 A 11/2013
CN 103763146 A 4/2014
(Continued)

OTHER PUBLICATIONS

First Office Action cited in Chinese Application No. 201610525177 dated Jun. 4, 2019.

*Primary Examiner* — Jimmy H Tran
(74) *Attorney, Agent, or Firm* — Perkins Coie LLP; Jordan Becker (57) ABSTRACT

Provided is a flow path detection method. The method comprises: a controller in an SDN network issuing reporting indication information to a forwarding device in the SDN network, wherein the reporting indication information is used for instructing the forwarding device to report, when receiving a message matching a pre-determined message feature, message forwarding information corresponding to the message, and the pre-determined message feature comprises: a source IP address and a destination IP address of a detection message for detecting a path, and a controller identifier of a controller; the controller receiving the message forwarding information reported by a plurality of forwarding devices according to the reporting indication information; and according to the received message forwarding information reported by the plurality of forwarding devices, determining a forwarding path between the source IP address and the destination IP address for the detection message.

12 Claims, 3 Drawing Sheets

(51) Int. Cl.
*H04L 12/715* (2013.01)
*H04L 29/12* (2006.01)
*H04L 12/24* (2006.01)
*G06F 9/455* (2018.01)

(52) U.S. Cl.
CPC .............. *H04L 45/20* (2013.01); *H04L 45/64* (2013.01); *H04L 61/2007* (2013.01); *H04L 61/6022* (2013.01); *G06F 2009/45595* (2013.01)

(56) References Cited

U.S. PATENT DOCUMENTS

| | | | | |
|---|---|---|---|---|
| 10,142,160 | B1* | 11/2018 | Adams | H04L 41/12 |
| 10,171,355 | B2* | 1/2019 | Wang | H04L 45/02 |
| 10,367,718 | B2* | 7/2019 | Zheng | H04L 69/16 |
| 10,484,206 | B2* | 11/2019 | Li | H04L 12/4633 |
| 10,565,001 | B2* | 2/2020 | Nakil | G06F 11/07 |
| 10,652,142 | B2* | 5/2020 | Qiao | H04L 61/103 |
| 2013/0103818 | A1* | 4/2013 | Koponen | H04L 47/825 |
| | | | | 709/223 |
| 2015/0215156 | A1* | 7/2015 | Yoon | H04L 45/64 |
| | | | | 370/225 |
| 2015/0271084 | A1* | 9/2015 | Nakakes | H04L 47/286 |
| | | | | 370/392 |
| 2015/0281066 | A1 | 10/2015 | Koley et al. | |
| 2016/0205014 | A1* | 7/2016 | Chen | H04L 43/0829 |
| | | | | 370/216 |
| 2016/0330167 | A1* | 11/2016 | Cai | H04L 67/2842 |
| 2016/0352653 | A1* | 12/2016 | Ranganathan | H04L 49/30 |
| 2017/0093706 | A1* | 3/2017 | Wang | H04L 45/42 |
| 2017/0104672 | A1* | 4/2017 | Liang | H04L 45/52 |
| 2017/0111230 | A1* | 4/2017 | Srinivasan | H04L 41/12 |
| 2017/0171039 | A1* | 6/2017 | Su | H04L 43/04 |
| 2017/0201435 | A1* | 7/2017 | Tan | H04L 41/085 |
| 2017/0346716 | A1* | 11/2017 | Zheng | H04L 45/38 |
| 2018/0006833 | A1* | 1/2018 | Tatlicioglu | H04L 45/48 |
| 2018/0167313 | A1* | 6/2018 | Qiao | H04L 45/64 |
| 2018/0173557 | A1* | 6/2018 | Nakil | H04L 41/0631 |
| 2018/0241586 | A1* | 8/2018 | Li | H04L 49/354 |
| 2019/0245772 | A1* | 8/2019 | Wen | H04L 45/38 |

FOREIGN PATENT DOCUMENTS

| | | |
|---|---|---|
| CN | 104579968 A | 4/2015 |
| CN | 104702468 A | 6/2015 |
| CN | 104780095 A | 7/2015 |

* cited by examiner

FLOW PATH DETECTION

CROSS-REFERENCE TO RELATED APPLICATIONS

This application is a continuation of PCT/CN2017/089489 filed Jun. 22, 2017, which claims the priority of the Chinese patent application No. 201610525177.2, filed on Jun. 29, 2016 and entitled "Flow Path Detecting Method and Apparatus", both of which are incorporated herein by reference in their entirety.

BACKGROUND ART

Software Defined Network (SDN) is a novel network innovative architecture, in this network, the control level of a network device is separated from the forwarding level thereof so as to realize flexible control of the network traffic. When there is a conventional Ethernet switch (i.e., a non-OpenFlow switch) in the SDN network and there is interconnection on a physical link between the OpenFlow switch and the conventional Ethernet switch, such a network may be referred to as an SDN hybrid network.

DETAILED DESCRIPTION OF EMBODIMENTS

The exemplary embodiments will be described in detail herein, examples of which are shown in the accompanying drawings. When figures are involved in the following description, unless otherwise indicated, the same numerals in different figures denote the same or similar elements. The implementation modes described in the following exemplary embodiments do not represent all the embodiments consistent with the present disclosure. Rather, they are merely examples of apparatus and methods consistent with some aspects of the present disclosure as detailed in the appended claims.

In the SDN hybrid network, a controller can interact with an OpenFlow switch through an OpenFlow protocol and interact with a conventional Ethernet switch through a Netconf protocol to realize topology collection and obtain physical topology of the SDN hybrid network. However, the controller may not be able to calculate, based on the physical topology, the message forwarding path between any subscriber hosts in the hybrid network, because it is the conventional routing protocol that runs in the SDN hybrid network and the forwarding path between the devices is calculated through the routing protocol, and this makes it impossible for the controller to predominate the flow paths in the hybrid network, and weakens the function of monitoring the entire hybrid network.

Figure 1:
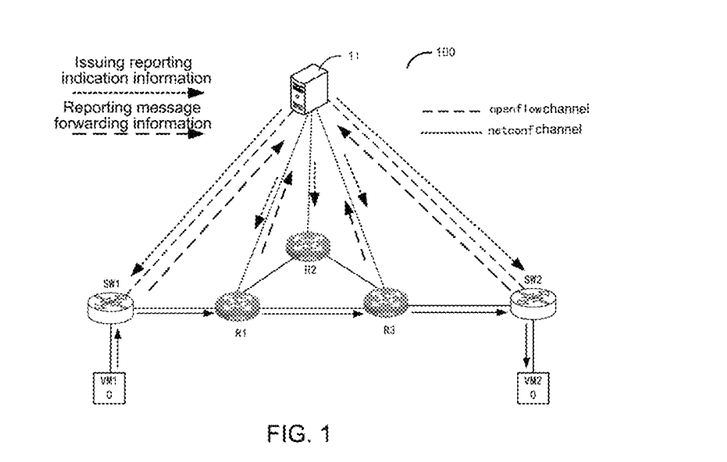
FIG. 1 is an architecture diagram of an SDN hybrid network according to an exemplary embodiment of the present disclosure.

FIG. 1 exemplarily illustrates an SDN hybrid network 100 which may comprise a controller 11 and a forwarding device for forwarding a message. In the SDN hybrid network, the forwarding device may include an OpenFlow switch and a non-OpenFlow switch, and the non-OpenFlow switch may be a conventional Ethernet switch. For example, the forwarding devices SW1 and SW2 in FIG. 1 are OpenFlow switches and the forwarding devices R1, R2 and R3 are Ethernet switches.

In the SDN hybrid network, the OpenFlow switches SW1 and SW2 may be set as access level switches of the network, which are used for connecting subscriber equipment, so that the controller 11 can sense in a timely manner the network access operation of a subscriber host through an OpenFlow management channel. For example, the subscriber host VM10 is connected to the access level switch SW1 and accesses the network through the access level switch SW1, and the subscriber host VM20 is connected to the access level switch SW2 and accesses the network through the access level switch SW2. The core level switches of the network may be set as Ethernet switches R1, R2 and R3. Link interconnection as shown in FIG. 1 may be conducted between the access level switches SW1 and SW2 and the above said core level switches R1, R2 and R3.

As shown in FIG. 1, OpenFlow connection may be established between the controller 11 and each of the access level switches SW1 and SW2 respectively, and Netconf connection may be established between the controller 11 and each of the core level switches R1, R2 and R3 respectively, wherein at the time of establishing the Netconf connection, the core level switches R1, R2 and R3 may act as Netconf servers and the controller 11 may act as a Netconf client. With regard to a message forwarded in the SDN hybrid network, it is feasible that each forwarding device runs a routing protocol and each forwarding device forwards the message according to a forwarding path calculated based on the routing protocol.

Since the message forwarding path in the hybrid network is calculated based on the routing protocol, the controller may not be able to grasp the path. An embodiment of the present disclosure provides a flow path detecting method, in order to enable a controller to accurately obtain a forwarding path of a data message in a hybrid network, and help the controller to monitor the network.

Figure 2:
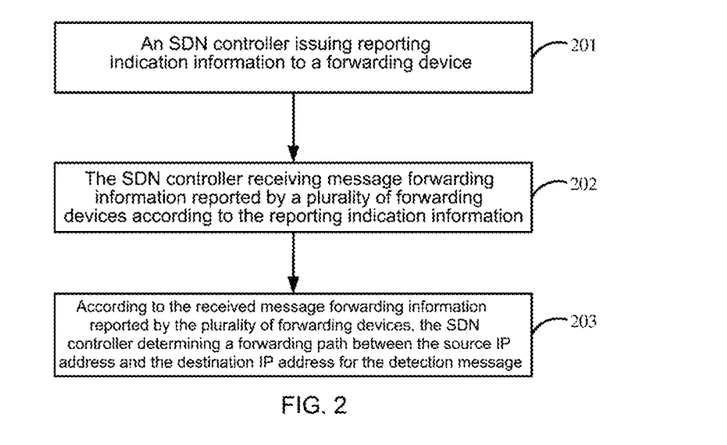
FIG. 2 is a flow chart of flow path detection according to an exemplary embodiment of the present disclosure.

FIG. 2 exemplarily illustrates a flow chart of a flow path detecting method, which may be executed by a controller in an SDN network, in this example, the SDN network includes an SDN hybrid network. As shown in FIG. 2, the method may comprise step 201-step 203.

In step 201, a controller issues reporting indication information to a forwarding device in an SDN network.

In this step, the reporting indication information sent by the controller may be used for instructing the forwarding device to report, when receiving a message matching a pre-determined message feature, message forwarding information corresponding to the message matching the pre-determined message feature. The pre-determined message feature may include: a source IP address and a destination IP address of a detection message for detecting a path, and a controller identifier of the controller.

In another example, the reporting indication information sent by the controller may be used for instructing the forwarding device to duplicate, when receiving a message matching a pre-determined message feature, the message matching the pre-determined message feature so as to obtain a duplicate message, and carry, in the duplicate message, message forwarding information corresponding to the message matching the pre-determined message feature and report the same to the controller. Illustratively, if the forwarding device is an OpenFlow switch, the manner in which the controller issues the reporting indication information to the forwarding device may be issuing a flow table to the forwarding device and instructing, through the issued flow table, the forwarding device to duplicate the message and report the message forwarding information. For example, the Match item of the flow table includes: the pre-determined message feature, and the Action item of the flow table includes: subtracting 1 from a Time To Live (TTL) value, duplicating the message and reporting, and reporting the message forwarding information.

In one example, each piece of message forwarding information may include: a device identifier of the forwarding device reporting the message forwarding information, an identifier of a forwarding port where the forwarding device reporting the message forwarding information forwards the message corresponding to the message forwarding information and the TTL value in the message corresponding to the message forwarding information when the forwarding device reporting the message forwarding information receives the message corresponding to the message forwarding information.

In step 202, the controller receives the message forwarding information reported by a plurality of forwarding devices according to the reporting indication information.

In this example, after issuing reporting indication information to a forwarding device in step 201, the controller can construct the detection message. The source IP address of the detection message is an IP address of a source host, the destination IP address is an IP address of a destination host, the source MAC address is a MAC address of the source host, and the destination MAC address is a MAC address of a source forwarding device to which the source host is connected. The detection message may further carry the controller identifier of the controller. The constructed detection message is issued to the source forwarding device so as to trigger the source forwarding device to forward the detection message to a destination forwarding device to which the destination host is connected.

In addition, when the forwarding device reports the message forwarding information by carrying it in the duplicate message, the message forwarding information received by the controller in this step may be obtained from the duplicate message. Then step 202 may comprise step 2021 and step 2022.

In step 2021, after receiving the duplicate message reported by the plurality of forwarding devices according to the reporting indication information, the controller acquires a message feature carried in the duplicate message.

In step 2022, after determining that the acquired message feature matches the predetermined message feature, the controller acquires the message forwarding information carried in the duplicate message.

In this way, the controller can determine, according to the source IP address, the destination IP address and the controller identifier in the message feature, whether the original message corresponding to the duplicate message is a detection message for detecting a path. If the message feature matches the predetermined message feature, it can be determined that the original message corresponding to the duplicate message is a detection message for detecting a path, and then the message forwarding information carried can be acquired from the duplicate message, which can thereby avoid interference from other messages.

In step 203, the controller determines, according to the received message forwarding information reported by the plurality of forwarding devices, a forwarding path of the detection message between the source IP address and the destination IP address.

In this step, the controller may sort the device identifiers and the forwarding port identifiers included in the received message forwarding information reported by the plurality of forwarding devices according to the reporting indication information, according to the descending order of the TTL values included in the received message forwarding information reported by the plurality of forwarding devices according to the reporting indication information, so as to obtain the forwarding path of the detection message between the source IP address and the destination IP address.

In this example, the controller obtains the order in which the message passes through the various forwarding devices during the message forwarding process, and also obtains the forwarding port of each forwarding device where the message is forwarded, and thereby can obtain the forwarding path of the message. In addition, the controller can monitor the network state according to the detected flow path, or in this example, the content carried in the message forwarding information is not limited, some parameters used for the controller to analyze the link quality may also be carried in the message forwarding information, so that the controller can analyze the delay, packet loss and other information of the link according to the message forwarding information.

How to detect the path by using the method of the present embodiment is described in detail with reference to FIG. 1 by taking the case as an example where the controller 11 detects the message forwarding path between the subscriber host VM10 and the subscriber host VM20; assuming that the forwarding path of the message sent by the subscriber host VM10 to the subscriber host VM20 that is calculated according to the routing protocol follows the path indicated by the solid arrow in FIG. 1, the controller 11 can obtain the path through the flow path detecting method of the present disclosure.

In this example, the controller 11 can construct a detection message, for example, the source IP address of the detection message is the IP address of the subscriber host VM10, the source MAC address is the MAC address of the subscriber host VM10, the destination IP address is the IP address of the subscriber host VM20, the destination MAC address is the MAC address of the access level switch SW1, the TTL value is 255, and the priority is the default priority. In addition, the detection message also carries the controller identifier of the controller 11, for example, the identifier may be an ID or IP address of the controller 11, etc. The identifier can be used for assisting the forwarding devices SW1, SW2, R1, R2 and R3 in identifying the message as a detection message on the one hand, and on the other hand, can enable the forwarding devices SW1, SW2, R1, R2 and R3 to get to know to which controller the message forwarding information needs to be reported, as to the function of the identifier, reference may be made to the description of the following embodiments.

After the detection message has been constructed, the controller 11 may send the reporting indication information to the access level switches SW1 and SW2 through the OpenFlow channel, and send the reporting indication information to the core level switches R1, R2 and R3 through the Netconf channel. In this example, the forwarding path of the message sent by the subscriber host VM10 to the subscriber host VM20 is indicated by the solid arrows in FIG. 1, however, since the controller 11 does not know the path, the controller 11 can issue the reporting indication information to each forwarding device in the SDN hybrid network that the message may pass through, the "forwarding device that the message may pass through" includes at least the devices through which the path indicated by the solid arrows in FIG. 1 passes, and may also include more other forwarding devices, for example, the controller 11 may also send the reporting indication information to the core level switch R2. As shown by the short dotted arrows in FIG. 1, the controller 11 may issue the reporting indication information to the access level switches SW1 and SW2 and the core level switches R1, R2 and R3.

The reporting indication information issued by the controller 11 to the access level switches SW1 and SW2 may be a flow table that may include a Match item and an Action item. The Match item may include the source IP address and the destination IP address of the detection message, and the controller identifier in the option field carried by the IP header. For example, the identifier may be the IP address of the controller 11. The three kinds of information included in the Match item may be referred to as predetermined message features.

The Action item in the flow table is used for indicating that when the message received by the forwarding device satisfies the predetermined message feature, the operation processing indicated by the Action item is executed. The Action item may instruct the forwarding device to perform the following processing: subtracting 1 from the TTL value carried by the header of the message, duplicating the message to the controller, and reporting the message forwarding information. The message forwarding information may include: a device identifier of the forwarding device, an identifier of a forwarding port (which may include an ingress port and an egress port) at which the forwarding device forwards the message, and a TTL value of the message when the forwarding device receives the message.

The controller 11 issuing the reporting indication information to the core level switch R1, R2 or R3 may be the controller 11 issuing a policy configuration through the Netconf channel. Specifically, the policy configuration may carry a predetermined message feature. The policy configuration, when being issued, may be sent to the core level switch R1, R2 or R3 in the form of a subscription request. After receiving the policy configuration sent in the form of a subscription request, the core level switch R1, R2 or R3 may, on the one hand, locally issue an access policy table which may include a key and an action corresponding to the key, wherein the key is a predetermined message feature, if the received message matches the predetermined message feature, the actions that may be executed are duplicating the message to obtain a duplicate message and sending the duplicate message to the Netconf protocol level of the Ethernet switch; and on the other hand, the core level switch R1, R2 or R3 may create a subscription event in the Netconf protocol level, when the Netconf protocol level receives the duplicate message, message forwarding information is carried in the duplicate message and the duplicate message is sent to the Netconf client (i.e., the controller 11) through a subscription message of the Netconf protocol. As denoted by the long dotted arrows in FIG. 1, the access level switches SW1 and SW2 and the core level switches R1 and R3 report the message forwarding information to the controller 11.

The controller 11 sends the constructed detection message to the access level switch SW1, after the access level switch SW1 receives the detection message sent by the controller 11, on the one hand, the access level switch SW1 first modifies, according to the flow table issued by the controller 11, the TTL value of the detection message to 254 by subtracting 1 therefrom, and then, forwards the detection message whose TTL value has been modified from the egress port port1 of the access level switch SW1 to the core level switch R1, and on the other hand, the access level switch SW1 determines that the detection message matches the predetermined message feature in the flow table, and sends the message forwarding information to the controller 11. The access level switch SW1 may carry the message forwarding information in the duplicate message obtained by duplicating the detection message, and report the duplicate message to the controller 11. The duplicate message may carry the following message forwarding information: a device identifier SW1, an identifier of an ingress port receiving the detection message, an identifier port1 of an egress port forwarding the detection message, and a TTL value of 255.

When the core level switch R1 receives the detection message forwarded by the access level switch SW1, on the one hand, the core level switch R1 modifies the TTL value of the detection message to 253 by further subtracting 1 therefrom, and then forwards the detection message whose TTL value has been modified to the core level switch R3, the detection message may enter from the ingress port port2 of the core level switch R1 and exit from the egress port port3 of the core level switch R1, and on the other hand, if determining that the detection message matches the predetermined message feature in the local access policy table, the core level switch R1 duplicates the detection message to obtain a duplicate message and sends the duplicate message to the Netconf protocol level of the core level switch R1, and after encapsulating the message forwarding information in the duplicate message, the protocol level of the core level switch R1 sends the duplicate message to the controller 11. The message forwarding information sent by the core level switch R1 in this step may include: a device identifier R1, an ingress port identifier port2, an egress port identifier port3, and a TTL value of 254.

Next, the detection message exiting the core level switch R1 may enter the core level switch R3 from the ingress port port4, exit the core level switch R3 from the egress port port5 and go to the access level switch SW2, moreover, the TTL value of the detection message received by the core level switch R3 is 253, and the core level switch R3 can subtract 1 from the TTL value of the detection message and then send the detection message to the access level switch SW2. The processing of the core level switch R3 sending the message forwarding information to the controller 11 is similar to the processing for the core level switch R2, which is not specifically described herein. The message forwarding information reported by the core level switch R3 may include: a device identifier R3, an ingress port identifier port4, an egress port identifier port5, and a TTL value of 253.

The processing after the detection message enters the access level switch SW2 from the port port6 of the access level switch SW2 is similar to the processing in the case of the access level switch SW1, the access level switch SW2 forwards the detection message to the subscriber host VM20 on the one hand and reports the message forwarding information to the controller 11 on the other hand, the message forwarding information may include: a device identifier SW2, an ingress port identifier port6, an egress port identifier, and a TTL value of 252.

After receiving the message forwarding information sent by the access level switches SW1 and SW2 and the core level switches R1 and R3, the controller 11 sorts, according to the descending order of TTL values, the identifiers of the forwarding devices and the forwarding ports through which the detection message passes during the forwarding process thereof as follows:

SW1(port1, TTL=255)—(port2)R1(port3, TTL=254)—(port4)R3(port5, TTL=253)—(port6)SW2(TTL=252)

In the sorting above, a port identifier on the left side of a device identifier (e.g., SW1, R1, etc.) is the port identifier corresponding to the ingress port from which the detection message enters the forwarding device, and a port identifier on the right side of a device identifier is the port identifier corresponding to the egress port from which the detection message exits the forwarding device. For example, (port2)R1(port3) indicates that the detection message enters the core level switch R1 from the port port2 (which is the port identifier of the ingress port) of the core level switch R1, and exits the core level switch R1 from the port port3 (which is the port identifier of the egress port), i.e., being forwarded to the core level switch R3 through the port port3.

In this example, the controller 11 obtains the flow path of the message from the subscriber host VM10 to the subscriber host VM20. In the above, the flow path includes the order in which the message passes through the various forwarding devices during the message forwarding process, and the ingress port and the egress port of each forwarding device where the message is forwarded. In addition, the controller can monitor the network state according to the detected flow path, or in this example, the content carried in the message forwarding information is not limited, some parameters used for the controller to analyze the link quality may also be carried in the message forwarding information, so that the controller can analyze the delay, packet loss and other information of the link according to the message forwarding information.

Corresponding to the foregoing embodiment of the flow path detecting method, the present disclosure further provides an embodiment of a flow path detecting apparatus.

Figure 3:
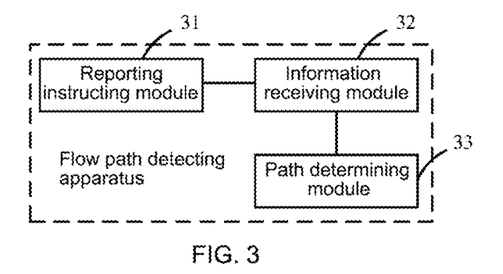
FIG. 3 is a diagram of functional modules of a flow path detecting apparatus according to an exemplary embodiment of the present disclosure.

The flow path detecting apparatus may be applied to a controller in an SDN network. Referring to FIG. 3, a diagram of functional modules of the flow path detecting apparatus is illustrated, as shown in FIG. 3, in terms of function, the apparatus may comprise a reporting instructing module 31, an information receiving module 32 and a path determining module 33.

The reporting instructing module 31 may be used for issuing reporting indication information to a forwarding device in the SDN network, the reporting indication information is used for instructing the forwarding device to report, when receiving a message matching a pre-determined message feature, message forwarding information corresponding to the message; and the pre-determined message feature comprises: a source IP address and a destination IP address of a detection message for detecting a path, and a controller identifier of a controller.

The information receiving module 32 may be used for receiving the message forwarding information reported by a plurality of forwarding devices according to the reporting indication information.

The path determining module 33 may be used for determining, according to the received message forwarding information reported by the plurality of forwarding devices, a forwarding path of the detection message between the source IP address and the destination IP address.

In one example, each piece of message forwarding information may include: a device identifier of the forwarding device reporting the message forwarding information, an identifier of a forwarding port where the forwarding device reporting the message forwarding information forwards the message corresponding to the message forwarding information and the TTL (Time To Live) value in the message corresponding to the message forwarding information when the forwarding device reporting the message forwarding information receives the message corresponding to the message forwarding information.

The path determining module 33 may be specifically used for sorting the device identifiers and the forwarding port identifiers included in the received message forwarding information reported by the plurality of forwarding devices according to the reporting indication information, according to the descending order of the TTL values included in the received message forwarding information reported by the plurality of forwarding devices according to the reporting indication information, so as to obtain the forwarding path of the detection message between the source IP address and the destination IP address.

In one example, the reporting instructing module 31 may be specifically used for instructing the forwarding device to duplicate, when receiving a detection message matching a pre-determined message feature, the message matching the pre-determined message feature so as to obtain a duplicate message, and carry, in the duplicate message obtained by duplication, message forwarding information corresponding to the message matching the pre-determined message feature and report the same to the controller.

Accordingly, the information receiving module 32 may be specifically used for acquiring, after receiving the duplicate message reported by the plurality of forwarding devices according to the reporting indication information, the message feature carried in the duplicate message, and acquiring, after determining that the message feature matches the predetermined message feature, the message forwarding information carried in the duplicate message.

In one example, the reporting instructing module 31 may be specifically used for issuing a flow table to the forwarding device, the Match item of the flow table includes: the pre-determined message feature, and the Action item of the flow table includes: subtracting 1 from the TTL, duplicating the message and reporting, and reporting the message forwarding information.

Figure 4:
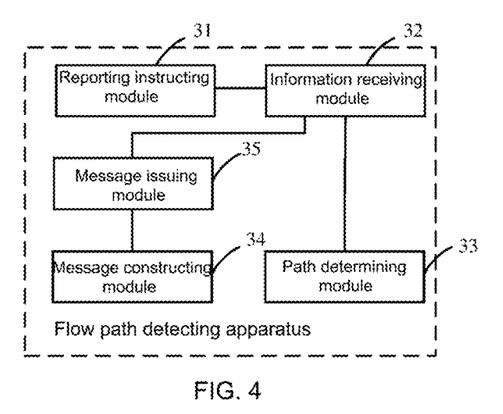
FIG. 4 is a diagram of functional modules of a flow path detecting apparatus according to another exemplary embodiment of the present disclosure.

In one example, as shown in FIG. 4, the apparatus may further comprise a message constructing module 34 and a message issuing module 35.

The message constructing module 34 may be used for constructing the detection message, the source IP address of the detection message is an IP address of a source host, the destination IP address thereof is an IP address of a destination host; the source MAC address of the detection message is a MAC address of the source host, and the destination MAC address thereof is a MAC address of a source forwarding device to which the source host is connected; the detection message also carries the controller identifier of the controller.

The message issuing module 35 may be used for issuing the constructed detection message to the source forwarding device, so as to trigger the source forwarding device to forward the detection message to a destination forwarding device to which the destination host is connected.

As to the specific process of realization of the function and effect of each unit of the apparatus, reference can be made to the implementation process of the corresponding step of the method, which will not be further described herein.

In addition, corresponding to the embodiment of the flow path detecting method described above, the present disclosure also provides an embodiment of the controller used for the implementation of the flow path detecting method.

Figure 5:
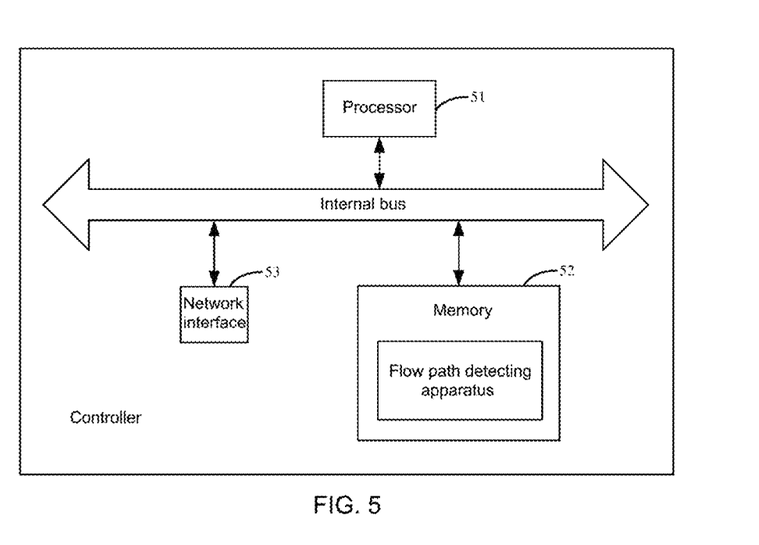
FIG. 5 is a hardware configuration diagram of a controller according to an exemplary embodiment of the present disclosure.

As shown in FIG. 5, a hardware structure diagram of the controller disclosed in the present disclosure is illustrated. Besides a processor 51, a memory 52 and a network interface 53 shown in FIG. 5, the controller may further comprise other hardware according to the actual functions of the controller, which will not be further described herein. In the memory 52 is stored a machine-readable instruction, and the processor 51 executes the flow path detecting method by reading the machine-readable instruction stored in the memory 52.

For the apparatus examples, since they substantially correspond to the method embodiment, reference can be made to the description of the method examples for relevant parts. The apparatus examples described above are merely illustrative, wherein the unit described as a separate component may or may not be physically separated, and the component shown as a unit may or may not be a physical unit, that is, it may be located in one place, or may also be distributed to multiple network units. Some or all of the modules can be selected according to actual needs to achieve the objects of the solutions of the present disclosure, which could be understood and implemented by a person of ordinary skills in the art without inventive effort.

The description above is merely preferred embodiments of the present disclosure, which is not used to limit the present disclosure. Any modifications, equivalent substitutions, improvements etc. within the spirit and principle of the present disclosure shall all be included in the scope of protection of the present disclosure.

What is claimed is:

1. A flow path detecting method, comprising steps of:
    a controller in an SDN network issuing reporting indication information to forwarding devices in the SDN network, wherein the reporting indication information is used for instructing the forwarding devices to report, when receiving a message matching a pre-determined message feature, message forwarding information corresponding to the message; and the pre-determined message feature comprises: a source IP address and a destination IP address of a detection message for detecting a path, and a controller identifier of the controller;
    the controller receiving the message forwarding information reported by a plurality of forwarding devices according to the reporting indication information; and
    the controller determining, according to the received message forwarding information reported by the plurality of forwarding devices, a forwarding path of the detection message between the source IP address and the destination IP address.

2. The method according to claim 1, wherein each piece of message forwarding information comprises:
    a device identifier of the forwarding device reporting the message forwarding information;
    an identifier of a forwarding port where the forwarding device reporting the message forwarding information forwards the message corresponding to the message forwarding information; and
    a Time To Live (TTL) value in the message corresponding to the message forwarding information when the forwarding device reporting the message forwarding information receives the message corresponding to the message forwarding information.

3. The method according to claim 2, wherein the step of the controller determining according to the message forwarding information a forwarding path of the detection message between the source IP address and the destination IP address comprises:
    the controller sorting the device identifiers and the forwarding port identifiers according to a descending order of the TTL values included in the received message forwarding information reported according to the reporting indication information by the plurality of forwarding devices, with the device identifiers and the forwarding port identifiers included in the received message forwarding information reported according to the reporting indication information by the plurality of forwarding devices, so as to obtain the forwarding path of the detection message between the source IP address and the destination IP address.

4. The method according to claim 1,
    wherein the reporting indication information is used for instructing the forwarding device to duplicate, when receiving the message matching the pre-determined message feature, the message matching the pre-determined message feature so as to obtain a duplicate message, and carry, in the duplicate message, message forwarding information corresponding to the message matching the pre-determined message feature and report the same to the controller;
    the step of the controller receiving the message forwarding information reported by a plurality of forwarding devices according to the reporting indication information comprises:
        the controller acquiring, after receiving the duplicate messages reported by the plurality of forwarding devices according to the reporting indication information, the message feature carried in each duplicate message; and
        the controller acquiring, after determining that the message feature matches the predetermined message feature, the message forwarding information carried in the duplicate message.

5. The method according to claim 4, wherein the step of issuing the reporting indication information to each forwarding device comprises:
    the controller issuing a flow table to the forwarding device,
    wherein a Match item of the flow table comprises the pre-determined message feature; and
    an Action item of the flow table comprises: subtracting 1 from the TTL value, duplicating and reporting the message, and reporting the message forwarding information.

6. The method according to claim 1, wherein the method further comprises:
    the controller constructing the detection message, wherein the source IP address of the detection message is an IP address of a source host, the destination IP address of the detection message is an IP address of a destination host; a source MAC address of the detection message is a MAC address of the source host, and a destination MAC address of the detection message is a MAC address of a source forwarding device to which the source host is connected; and the detection message further carries the controller identifier of the controller; and
    the controller issuing the constructed detection message to the source forwarding device so as to trigger the source forwarding device to forward the detection message to a destination forwarding device to which the destination host is connected.

7. A controller, comprising a processor and a memory storing machine-readable instructions, the processor executing, through the machine-readable instructions stored in the memory, processes of:
- issuing reporting indication information to forwarding devices in an SDN network, wherein the reporting indication information is used for instructing the forwarding devices to report, when receiving a message matching a pre-determined message feature, message forwarding information corresponding to the message, wherein the pre-determined message feature comprises: a source IP address and a destination IP address of a detection message for detecting a path, and a controller identifier of the controller;
- receiving the message forwarding information reported by a plurality of forwarding devices according to the reporting indication information; and
- determining, according to the received message forwarding information reported by the plurality of forwarding devices, a forwarding path of the detection message between the source IP address and the destination IP address.

8. The controller according to claim 7, wherein each piece of message forwarding information comprises:
- a device identifier of the forwarding device reporting the message forwarding information;
- an identifier of a forwarding port where the forwarding device reporting the message forwarding information forwards the message corresponding to the message forwarding information; and
- a Time To Live (TTL) value in the message corresponding to the message forwarding information when the forwarding device reporting the message forwarding information receives the message corresponding to the message forwarding information.

9. The controller according to claim 8, wherein the executed process of determining, according to the message forwarding information a forwarding path of the detection message between the source IP address and the destination IP address comprises:
- sorting the device identifiers and the forwarding port identifiers according to a descending order of the TTL values included in the received message forwarding information reported according to the reporting indication information by the plurality of forwarding devices, with the device identifiers and the forwarding port identifiers included in the received message forwarding information reported by the plurality of forwarding devices according to the reporting indication information, so as to obtain the forwarding path of the detection message between the source IP address and the destination IP address.

10. The controller according to claim 7, wherein the reporting indication information is used for instructing the forwarding device to duplicate, when receiving the message matching the pre-determined message feature, the message matching the pre-determined message feature so as to obtain a duplicate message, and carry, in the duplicate message, message forwarding information corresponding to the message matching the pre-determined message feature and report the same to the controller;
- the executed process of receiving the message forwarding information reported by a plurality of forwarding devices according to the reporting indication information comprises:
- acquiring, after receiving the duplicate messages reported by the plurality of forwarding devices according to the reporting indication information, the message feature carried in each duplicate message; and
- acquiring, after determining that the message feature matches the predetermined message feature, the message forwarding information carried in the duplicate message.

11. The controller according to claim 10, wherein the executed process of issuing the reporting indication information to each forwarding device comprises:
- issuing a flow table to the forwarding device,
- wherein a Match item of the flow table comprises the pre-determined message feature; and
- an Action item of the flow table comprises subtracting 1 from the TTL value, duplicating and reporting the message, and reporting the message forwarding information.

12. The controller according to claim 7, wherein the processor further executes, by reading the machine-readable instructions stored in the memory, processes of:
- constructing the detection message, wherein the source IP address of the detection message is an IP address of a source host; the destination IP address of the detection message is an IP address of a destination host, a source MAC address of the detection message is a MAC address of the source host, and a destination MAC address of the detection message is a MAC address of a source forwarding device to which the source host is connected; and the detection message further carries the controller identifier of the controller; and
- issuing the constructed detection message to the source forwarding device so as to trigger the source forwarding device to forward the detection message to a destination forwarding device to which the destination host is connected.

* * * * *